UNITED STATES PATENT OFFICE.

JOHANN F. BARTH AND HENRY BARTH, OF CINCINNATI, OHIO.

COMPOSITION FOR PRESERVING SAUSAGES.

SPECIFICATION forming part of Letters Patent No. 261,983, dated August 1, 1882.

Application filed December 1, 1881. (No specimens.)

*To all whom it may concern:*

Be it known that we, JOHANN FRIEDRICH BARTH and HENRY BARTH, both of Cincinnati, Hamilton county, Ohio, have jointly invented a new and useful Composition for Preserving Sausages, of which the following is a specification.

The composition forming the subject of the present invention is designed to form an air-tight covering for sausages packed in open or permeable receptacles; and it is chiefly intended for use in connection with sausages whose inclosing-bags are of linen, muslin, or other textile material.

We are well aware that meats, both fresh and cooked, have been preserved by packing the same in a jelly consisting generally of gelatine and glycerine and other gelatinous air-excluding substances. Sausages provided with an integument of some textile material have with difficulty been preserved or prevented from becoming moldy or stale by atmospheric influences; and the object of our invention is to provide a composition which is cheap and which satisfactorily answers the purpose of permitting sausages of the description above mentioned to be put up in open or permeable receptacles, such for example, as flour-barrels, ordinary packing-boxes, or open buckets.

The manner of using our composition is as follows, viz: The sausages, having been first smoked in the usual way and suffered to cool, are, as soon as practicable—not to exceed two weeks—packed in their intended receptacles and are then completely flooded by a magma of the following composition: To every ten pounds of cold clear water we add one pound of corn-starch, and boil and stir the same for ten minutes. To the gelatious mass thus produced we add and stir one pound of New Orleans molasses, and to that one ounce of borax and three-fourths of an ounce of Cayenne pepper. To each gallon of the above we then add one pound of good packing-salt. The above compound is well stirred and boiled for ten minutes, and, while still hot, is poured into the packed receptacles in sufficient quantity to thoroughly fill and occupy all the interstices between the sausages and to cover the same. The magma, on cooling, "sets" into a compact and tenacious mass that effectually protects the meat from atmospheric influences. This magma, which is perfectly clean and even edible, is found not to interfere with or get into the sausages.

The sausages nearest to the top of the receptacle may easily be removed without disturbance of the remainder.

In warm weather before removal of the contents the receptacle, if a can or a bucket, may be advantageously placed for a few minutes in cold water in order to thoroughly congeal the magma, from which the sausages will be found to then freely separate.

The magma, after having served its primary purpose, as above, may be fed, with great advantage, to chickens and other domesticated omnivora.

While chiefly intended for use with sausages having muslin bags or cases, our process is also applicable to the packing of sausages incased in guts.

We claim as new and of our invention—

The composition herein described for preserving sausages, consisting of starch, molasses, borax, Cayenne pepper, water, and salt in or about the proportions specified.

In testimony of which invention we hereunto set our hands.

JOHANN FRIEDRICH BARTH.
HENRY BARTH.

Attest:
GEO. H. KNIGHT,
SAML. S. CARPENTER.